2,709,175
Patented May 24, 1955

2,709,175
ALDEHYDE-DICYCLOPENTADIENYLIRON REACTION PRODUCT AND METHOD OF MAKING

Peter J. Graham, Kennett Square, Pa., assignor to E. I. du Pont de Nemours and Company, Wilmington, Del., a corporation of Delaware No Drawing. Application January 12, 1953, Serial No. 330,903

7 Claims. (Cl. 260—439)

This invention relates to the reaction of dicyclopentadienyliron with aldehydes and the products obtained.

Organometallic compounds are of interest for a number of catalytic applications. Certain organometallics have achieved importance as antiknock agents for spark ignition engines. An example of such is tetraethyl lead. This compound has the disadvantage of being quite toxic. Other organometallic compounds such as hydrocarbolithium and hydrocarbosodium compounds are useful in organic synthetic reactions. When such organometallics as these are treated with carbonyl compounds, an alkylation reaction takes place in which the product of reaction is unstable to water and/or heat. The stable products obtained do not have any carbon to metal bonds.

This invention has as an object the preparation of new stable organic materials having carbon-iron bonds. Other objects will appear hereinafter.

These objects are accomplished by the present invention wherein dicyclopentadienyliron is reacted, with an aldehyde, preferably an aldehyde containing only carbon, hydrogen, and the carbonyl oxygen, in an inert liquid medium at a temperature of 20–150° C. and in the presence of a catalytic amount of a strong acid, i. e., an acid having a $pK_a$ of not more than 1.5, the ratio of the carbonyl compound to the dicyclopentadienyliron being at least 1 to 10 on a molar basis.

The products obtained by the process of this invention vary in properties depending upon the amount of the carbonyl compound reacted with the dicyclopentadienyliron. Thus, products can be obtained which range in solubility from those that are soluble to those relatively insoluble in alkanoic acids. The soluble products are obtained by the use of lower aldehyde to dicyclopentadienyliron ratios, e. g., of up to five, during the reaction. These soluble products are obtained in solid form by dilution of acetic acid solutions with water. Purification is accomplished by crystallization from various solvents, such as n-heptane. The insoluble products result from reactions containing higher ratios of aldehyde to dicyclopentadienyliron. These latter products are purified by removal of the solvents and unreacted starting materials, e. g., by distillation or sublimation.

The following examples in which parts are by weight are illustrative of the invention.

Example I

A solution of 5.5 g. (0.03 mole) of dicyclopentadienyliron ($C_{10}H_{10}Fe$), 10.0 g. of alkaform (a formaldehyde polymer), and 1.0 ml. of concentrated hydrochloric acid was prepared in 125 ml. of glacial acetic acid at room temperature. The solution was allowed to stand at room temperature, and the reaction proceeded slowly as evidenced by successive color changes. A dark green, clear solution developed first and after 64 hours a very dark green, insoluble product separated from solution. After seven days the mixture was filtered and the insoluble product washed with acetic acid. The filtrates were set aside for later workup. Extraction of the insoluble product with benzene and methanol gave 1.1 g. of unreacted dicyclopentadienyliron. The residue was then extracted four times with 100 ml. of boiling methanol containing a trace of potassium hydroxide to remove unreacted alkaform. The black residue now weighed 1.8 g. and did not melt below 300° C. Analysis showed it contained 64.05% carbon, 5.5% hydrogen, and 24.99% iron corresponding to the empirical formula $C_{12}H_{11.4}Fe$. This reaction product of dicyclopentadienyliron and formaldehyde had little or no solubility in a large variety of organic solvents. Dilution of the acetic acid filtrates with water precipitated a yellow-green compound that was filtered and washed with water. Vacuum sublimation of the dried product removed 0.23 g. of unreacted dicyclopentadienyliron and left 0.38 g. of a shiny black residue. This residue melted at 109–112° C. and analyzed for 65.19% carbon, 5.40% hydrogen, and 27.30% iron corresponding to the empirical formula $C_{11}H_{11}Fe$.

Example II

A boiling solution of 11.0 g. (0.06 mole) of dicyclopentadienyliron in 60 ml. glacial acetic acid was added to a boiling solution of 5.0 g. paraformaldehyde (Merck U. S. P. X) and 5 drops of concentrated hydrochloric acid in 40 ml. of acetic acid. The reaction was allowed to cool slowly for 15 minutes at room temperature and then cooled in an ice-bath for one hour. The reaction mixture was filtered and the insoluble product extracted with hot methanol to remove unreacted dicyclopentadienyliron. This left a yellow-brown product weighing 3.41 g. that was soluble in benzene, n-heptane, and carbon tetrachloride, and was slightly soluble in hot methanol. This product appeared to decompose near 82° C. to give dicyclopentadienyliron and some dark colored liquid, even after previous treatment at 60–70° C. under high vacuum to insure removal of last traces of unreacted dicyclopentadienyliron. The product had an average composition of 64.68% carbon, 5.40% hydrogen, and 29.38% iron, totaling 99.46% and corresponding to the empirical formula $C_{10.2}H_{10.3}Fe$.

The acetic acid solution from the original filtration was combined with the methanol extracts of the acetic acid-insoluble product and the whole diluted with a large volume of water to precipitate any remaining products. This gave 6.86 g. of a yellow-brown product that was vacuum sublimed to give 5.52 g. of unreacted dicyclopentadienyliron and 1.3 g. of a yellow, nonvolatile powder. This yellow powder was soluble in benzene, n-heptane and carbon tetrachloride, and had a melting point of 93.5–100° C. yielding a brown, opaque melt. Average analyses for this product were 64.88% carbon, 5.33% hydrogen, and 28.49% iron, totaling 98.70% and corresponding to an empirical formula $C_{10.6}H_{10.4}Fe$.

Example III

The experiment of Example II was repeated except that the reaction mixture was allowed to stand 1¼ hours instead of 15 minutes. During this interval the reaction mixture cooled slowly to room temperature. The acetic acid insoluble product was olive green and weighed 3.72 g. after two extractions with 100 ml. of boiling methanol. This reaction product was soluble in benzene and carbon tetrachloride, partially soluble in n-heptane, and melted at 54–74° C. Average analyses for this product were 66.98% carbon, 5.14% hydrogen, and 26.73% iron, which totaled 98.85% and corresponded to the empirical formula $C_{11.7}H_{10.8}Fe$. This product also showed a molecular weight of 262 and 257 in benzene.

The products soluble in acetic acid were separated as in Example II into 4.25 g. of unreacted dicyclopentadienyliron and 1.76 g. of a yellow product, melting at 75–80° C., that was soluble in benzene, carbon tetrachloride, and n-heptane. This product had average analyses of 66.16% carbon, 5.34% hydrogen, and 26.40% iron, which totaled 97.9% and corresponded to the empirical formula $C_{11.7}H_{11.3}Fe$.

Example IV

A solution of 5.5 g. (0.03 mole) of dicyclopentadienyliron, 6.4 g. (0.06 mole) of benzaldehyde and 1.0 ml. of concentrated hydrochloric acid was prepared in 125 ml. of glacial acetic acid at room temperature. After one week standing, the reaction mixture was filtered, washed with 10 ml. of glacial acetic acid, and finally with water. The very dark product was dried in a vacuum desiccator over $P_2O_5$ and sublimed to give 1.71 g. of unreacted dicyclopentadienyliron and 1.75 g. of a black residue. The black powder had an indefinite decomposition point beginning near 140° C. and did not show a melting point up to 300° C. Average analyses for this product showed 69.40% carbon, 4.96% hydrogen, 18.17% iron, and 7.47% oxygen (by difference). This corresponds to the empirical formula $C_{17.8}H_{15.3}FeO_{1.4}$. Compared with the original dicyclopentadienyliron ($C_{10}H_{10}Fe$), this formula corresponds to the addition of $C_{7.8}H_{5.3}O_{1.4}$ or approximately one benzaldehyde unit ($C_7H_6O$).

The dicyclopentadienyliron employed as a starting material for the process of this invention can be prepared as described by Kealy and Pauson, Nature 168, 1039 (1951). It can also be prepared by the process, disclosed in the copending application of Graham and Whitman, Serial No. 319,602, filed November 8, 1952, wherein pyrophoric ferrous oxide, e. g., that made by decomposition of a suitable ferrous salt, e. g., ferrous oxalate, at a temperature of 300–450° C., preferably in the presence of cyclopentadiene, is reacted with cyclopentadiene.

Although any aldehyde can be employed in the process of this reaction, it is preferred that the aldehyde be free from other reactive groups, i. e., have the carbonyl group as the only reactive group. Particularly useful are the hydrocarbo-aldehydes, i. e., compounds which are hydrocarbon except for the carbonyl oxygen, and of these those having 1–7 carbons are generally most readily available and reactive. Formaldehyde is particularly preferred. In place of formaldehyde itself, which is relatively difficult to obtain in a pure anhydrous condition, formaldehyde-yielding polymers, such as paraformaldehyde, are generally used. In addition to formaldehyde and benzaldehyde, other aldehydes that are useful for this reaction include acetaldehyde, propionaldehyde, butyraldehyde, chloral, hexahydrobenzaldehyde, p-nitrobenzaldehyde, methoxybenzaldehyde and hydroxybenzaldehyde. The ratio of aldehyde to dicyclopentadienyliron employed can be varied widely, particularly since the products obtained are capable of wide variation in properties due to the amount of aldehyde combined with the iron compound. In general the molar ratio of aldehyde to dicyclopentadienyliron is at least 1 to 10 and generally 1 to 1 or higher. The upper limit is not important and can be as high as 100 to 1 or even higher. When the ratio of aldehyde to dicyclopentadienyliron is low, e. g., 5 or less, soluble and low melting products are generally obtained when the ratio is higher, e. g., 10 or higher, insoluble and infusible products are obtained.

The reaction of this invention is catalyzed by the presence of a small amount of strong acid, i. e., acids which have a $pK_a$ of not more than 1.5. Included in the acids are phosphoric, sulfuric, hydrobromic, p-toluenesulfonic, hydrochloric and trichloroacetic acids. Of these acids the mineral acids are preferred. The amount of acid present is generally not large. Amounts of the order of between one part by weight of the acid to from 10 to 1000 parts of the dicyclopentadienyliron are generally useful. The requirement on the amount employed is that it be sufficient to catalyze the reaction.

Any inert diluent may be used for this reaction. It is preferred that the aldehyde and iron compound possess solubility in the reaction medium. Alkanoic acids of 1–6 carbons are examples of solvents that are useful. The reaction is preferably carried out under relatively anhydrous conditions. Aqueous conditions can be used but reduce the yield of product obtained.

The temperature and time employed are interdependent variables and the properties of the products are generally related to the exact conditions employed for the reaction. In general temperatures of from 20–150° C. are satisfactory with the faster rates of reaction being obtained at the higher temperatures, e. g., 125° C. Time of from a few minutes to several days can be employed.

The reaction products vary in properties depending upon the particular aldehyde and the amount combined with the dicyclopentadienyliron. The greater the amount of aldehyde combined in the product, the more insoluble is the product. The following table illustrates some of the properties of dicyclopentadienyliron-formaldehyde reaction products:

| Property | Dicyclopentadienyliron | Dicyclopentadienyliron/Formaldehyde Reaction Products |
| --- | --- | --- |
| Color | Red-brown | Green to olive to black. |
| Melting Point | 172–173° C | 55° C. to infusibility. |
| Volatility | Volatile | Nonvolatile or decompose to dicyclopentadienyliron and other products. |
| Chemical reactions | Readily oxidized. | Similar to dicyclopentadienyliron. |
| Empirical formula | $C_{10}H_{10}Fe$ | $C_{10.2}H_{10.3}Fe$ to $C_{12}H_{11.4}Fe$. |

Some of the low melting and soluble products are capable of being transformed by heat to brittle, transparent, non-tacky films.

The products of this invention are useful as anti-knock agents for spark ignition engines. They are also of utility in the preparation of pigments, particularly where thermal stability is required. They are particularly valuable since they are substantially nontoxic.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A water-insoluble, non-volatile formaldehyde-dicyclopentadienyliron product of the reaction, in the presence of a strong acid, of dicyclopentadienyliron with formaldehyde.

2. A water-insoluble, non-volatile aldehyde-dicyclopentadienyliron product of the reaction of dicyclopentadienyliron with an aldehyde which is hydrocarbon except for carbonyl oxygen.

3. A water-insoluble, non-volatile aldehyde-dicyclopentadienyliron product of the reaction of dicyclopentadienyliron with an aldehyde which is hydrocarbon except for carbonyl oxygen and of one to seven carbons.

4. A process of preparing a water-insoluble, non-volatile formaldehyde/dicyclopentadienyliron reaction product which comprises reacting dicyclopentadienyliron with formaldehyde in the presence of a strong acid.

5. A process of preparing a water-insoluble, non-volatile formaldehyde/dicyclopentadienyliron reaction product which comprises reacting dicyclopentadienyliron with formaldehyde in an inert liquid diluent containing a strong mineral acid.

6. A process of preparing a water-insoluble, non-volatile hydrocarboaldehyde/dicyclopentadienyliron reaction product which comprises reacting dicyclopentadienyliron, in the presence of a strong acid, with a hydrocarboaldehyde, hydrocarbon except for carbonyl oxygen.

7. A process of preparing a water-insoluble, non-volatile hydrocarboaldehyde/dicyclopentadienyliron reaction product which comprises reacting dicyclopentadienyliron, in the presence of a strong acid, with a hydrocarboaldehyde, hydrocarbon except for carbonyl oxygen and having from one to seven carbon atoms.

No references cited.